US012292547B2

(12) United States Patent
Sitter, Jr.

(10) Patent No.: US 12,292,547 B2
(45) Date of Patent: May 6, 2025

(54) ATHERMAL INFRARED OPTICAL TELESCOPE AND METHOD FOR MANUFACTURING

(71) Applicant: Raytheon Company, Waltham, MA (US)

(72) Inventor: David N. Sitter, Jr., Torrance, CA (US)

(73) Assignee: Raytheon Company, Arlington, VA (US)

( * ) Notice: Subject to any disclaimer, the term of this patent is extended or adjusted under 35 U.S.C. 154(b) by 330 days.

(21) Appl. No.: 17/207,350

(22) Filed: Mar. 19, 2021

(65) Prior Publication Data

US 2022/0299679 A1    Sep. 22, 2022

(51) Int. Cl.
| | |
|---|---|
| *G02B 1/02* | (2006.01) |
| *G02B 13/14* | (2006.01) |
| *G02B 13/18* | (2006.01) |
| *G02B 23/16* | (2006.01) |
| *G02B 25/00* | (2006.01) |

(Continued)

(52) U.S. Cl.
CPC ............... *G02B 1/02* (2013.01); *G02B 13/14* (2013.01); *G02B 13/18* (2013.01); *G02B 23/16* (2013.01); *G02B 25/001* (2013.01); *H04N 23/50* (2023.01); *H04N 23/57* (2023.01)

(58) Field of Classification Search
CPC .......... G02B 1/02; G02B 13/14; G02B 13/18; G02B 23/16; G02B 25/001; G02B 7/028; G02B 25/00; H04N 23/50; H04N 23/57; H04N 5/225
See application file for complete search history.

(56) References Cited

U.S. PATENT DOCUMENTS

| | | | |
|---|---|---|---|
| 4,431,917 A | 2/1984 | Gibbons | |
| 4,479,695 A * | 10/1984 | Neil | G02B 23/00 359/708 |
| 4,679,891 A | 7/1987 | Roberts | |

(Continued)

OTHER PUBLICATIONS

Heidler, Lukowicz, Hilpert, Risse, Alber, Klement, Heine, Bolter, and Armengol, Topology optimization and additive manufacturing of an optical housing for space applications, EPJ Web of Conferences—EOS Optical Technologies, 215, 01005 (2019) (Year: 2019).*

(Continued)

*Primary Examiner* — Balram T Parbadia (57) ABSTRACT

A device includes an entrance pupil configured to receive light from a distant source. The device also includes an exit pupil configured to output the light to at least one component of an imaging system. The device further includes a plurality of lenses disposed optically between the entrance pupil and the exit pupil, where the lenses are grouped into an objective group and an eyepiece group. In addition, the device includes a housing surrounding the lenses and formed of a housing material. The lenses are formed of one or more lens materials selected based on a thermo-optical coefficient of the one or more lens materials and a coefficient of thermal expansion (CTE) of the housing material. The lens materials can be selected to have a thermo-optical coefficient that is closest to the CTE of the housing material among thermo-optical coefficients of a plurality of possible lens materials.

20 Claims, 4 Drawing Sheets

(51) Int. Cl.
*H04N 23/50* (2023.01)
*H04N 23/57* (2023.01)

(56) References Cited

U.S. PATENT DOCUMENTS

| | | | | |
|---|---|---|---|---|
| 4,989,962 A * | 2/1991 | Kebo | ................... | G02B 1/02 |
| | | | | 359/422 |
| 5,504,628 A | 4/1996 | Borchard | | |
| 5,548,439 A * | 8/1996 | Smith | ................... | G02B 15/02 |
| | | | | 359/566 |
| 5,909,308 A | 6/1999 | Ulrich | | |
| 6,999,243 B2 | 2/2006 | Chipper | | |
| 8,101,918 B1 | 1/2012 | Mercado | | |
| 2005/0279923 A1 * | 12/2005 | Ispasoiu | ................ | F25B 21/02 |
| | | | | 257/E31.117 |
| 2006/0187561 A1 * | 8/2006 | Trunz | ................... | C22C 21/02 |
| | | | | 359/819 |
| 2011/0080562 A1 * | 4/2011 | Iizuka | ................... | A61B 3/0025 |
| | | | | 351/233 |
| 2011/0228250 A1 * | 9/2011 | Xie | ................... | G02B 7/028 |
| | | | | 356/4.04 |
| 2012/0147913 A1 * | 6/2012 | Ushinsky | ............. | C30B 31/22 |
| | | | | 118/503 |
| 2014/0268315 A1 * | 9/2014 | Carlie | .................. | G02B 13/14 |
| | | | | 359/356 |
| 2016/0282194 A1 * | 9/2016 | Barnett | ................ | H10N 10/01 |
| 2018/0321457 A1 * | 11/2018 | Symmons | ............. | B29D 11/00 |
| 2020/0033549 A1 * | 1/2020 | Liu | ...................... | G03B 13/32 |
| 2020/0116979 A1 * | 4/2020 | Kathman | .............. | G02B 7/028 |
| 2020/0154020 A1 * | 5/2020 | Byrne | .................. | G02B 7/028 |
| 2021/0271097 A1 * | 9/2021 | Moser | .................. | G02B 27/30 |
| 2021/0389548 A1 * | 12/2021 | Schweitzer | ........... | G02B 7/028 |

OTHER PUBLICATIONS

Covington, Astrophotography for the Amateur, 2nd edition, Cambridge University Press (1999), Chapter 6. (Year: 1999).*

* cited by examiner

| SURFACE | SURF TYPE | RADIUS | THICKNESS | MATERIAL | DIAMETER |
|---|---|---|---|---|---|
| OBJECT | SPHERE | INFINITY | INFINITY | | |
| ENTRANCE PUPIL | SPHERE | INFINITY | 8 | | 4 |
| LENS 111 SIDE A | ASPHERE | 10.2574532 | 0.7 | AMTIR-2 | 5.026 |
| LENS 111 SIDE B | SPHERE | 43.29786718 | 0.05 | | 4.9 |
| LENS 112 SIDE A | ASPHERE | 22.59069085 | 0.55 | ZnSe | 4.838 |
| LENS 112 SIDE B | SPHERE | 11.62983818 | 12.07762852 | | 4.624 |
| LENS 121 SIDE A | ASPHERE | -3.070720075 | 0.53 | BaF2 | 1.758 |
| LENS 121 SIDE B | SPHERE | -7.440617725 | 0.328690161 | | 1.978 |
| LENS 122 SIDE A | SPHERE | -1.577723798 | 0.406 | Ge | 2.05 |
| LENS 122 SIDE B | SPHERE | -2.089134226 | 0.213154638 | | 2.458 |
| LENS 123 SIDE A | SPHERE | -77.55919239 | 0.596 | AMTIR-2 | 2.88 |
| LENS 123 SIDE B | ASPHERE | -3.964982433 | 4.548526676 | | 2.992 |
| EXIT PUPIL | SPHERE | INFINITY | 0 | | 1 |

ASPHERIC SURFACE PARAMETERS

| SURFACE | CONIC CONSTANT, K | A (r^4) | B (r^6) | C (r^8) | D (r^10) |
|---|---|---|---|---|---|
| LENS 111 SIDE A | 0 | -1.602927E-04 | 3.865444E-06 | -2.396274E-06 | 1.880068E-07 |
| LENS 112 SIDE B | 0 | 1.586818E-04 | -7.223778E-06 | 3.958520E-06 | -3.412164E-07 |
| LENS 121 SIDE A | 0 | -1.840070E-02 | 7.058040E-03 | -1.686733E-02 | 1.286279E-02 |
| LENS 123 SIDE B | 0 | 2.815540E-03 | 1.372891E-04 | -2.885267E-05 | 6.736687E-06 |

MATERIAL PROPERTIES

| | INDEX OF REFRACTION AT 20C | | | | | |
|---|---|---|---|---|---|---|
| | WAVELENGTH [MICRONS] | | | | | |
| MATERIAL | 9.5 | 8.75 | 8 | CTE [x E-6/C] | dn/dT [x E-6/C] | (1/f) df/dT [x E-6 1/C] |
| AMTIR-2 | 2.77150 | 2.77341 | 2.77519 | 22.5 | 31 | 5.02 |
| ZnSe | 2.40942 | 2.41351 | 2.41726 | 7.26 | 60.9 | -35.8 |
| BaF2 | 1.40816 | 1.41749 | 1.42589 | 18.1 | -15.1 | 54.3 |
| Ge | 4.00288 | 4.00370 | 4.00477 | 5.67 | 405 | -129 |

FIG. 5

ATHERMAL INFRARED OPTICAL TELESCOPE AND METHOD FOR MANUFACTURING

TECHNICAL FIELD

This disclosure is generally directed to optical systems. More specifically, this disclosure is directed to an athermal infrared optical telescope and a method for manufacturing.

BACKGROUND

Infrared telescopes are ubiquitous in various commercial and defense-related applications. These systems often need to remain in focus over wide temperature ranges. Unfortunately, most infrared materials have a high change in index of refraction due to temperature (dn/dT) and a high coefficient of thermal expansion (CTE) that cause the focus to shift significantly when used with common housing materials such as aluminum. As a result, most infrared telescopes are not athermal for focus over wide operating temperature ranges.

SUMMARY

This disclosure provides an athermal infrared optical telescope and a method for manufacturing.

In a first embodiment, a device includes an entrance pupil configured to receive light from a distant source. The device also includes an exit pupil configured to output the light to at least one component of an imaging system. The device further includes a plurality of lenses disposed optically between the entrance pupil and the exit pupil, where the lenses are grouped into an objective group and an eyepiece group. In addition, the device includes a housing surrounding the lenses and formed of a housing material. The lenses are formed of one or more lens materials selected based on a thermo-optical coefficient of the one or more lens materials and a coefficient of thermal expansion (CTE) of the housing material.

In a second embodiment, a system includes a telescope, an optical imager, and an image sensor. The telescope includes an entrance pupil configured to receive light from a distant source. The telescope also includes an exit pupil configured to output the light for reception by the optical imager and the image sensor. The telescope further includes a plurality of lenses disposed optically between the entrance pupil and the exit pupil, where the lenses are grouped into an objective group and an eyepiece group. In addition, the telescope includes a housing surrounding the lenses and formed of a housing material. The lenses are formed of one or more lens materials selected based on a thermo-optical coefficient of the one or more lens materials and a CTE of the housing material.

In a third embodiment, a method includes providing an entrance pupil configured to receive light from a distant source. The method also includes providing an exit pupil configured to output the light to at least one component of an imaging system. The method further includes arranging a plurality of lenses optically between the entrance pupil and the exit pupil, where the lenses are grouped into an objective group and an eyepiece group. In addition, the method includes providing a housing around the lenses to form a telescope. The housing is formed of a housing material. The lenses are formed of one or more lens materials selected based on a thermo-optical coefficient of the one or more lens materials and a CTE of the housing material.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, infrared telescopes are ubiquitous in various commercial and defense-related applications. These systems often need to remain in focus over wide temperature ranges. Unfortunately, most infrared materials have a high change in index of refraction due to temperature (dn/dT) and a high coefficient of thermal expansion (CTE) that cause the focus to shift significantly when used with common housing materials such as aluminum. As a result, most infrared telescopes are not athermal for focus over wide operating temperature ranges.

Attempts to athermalize a telescope by actively or passively focusing a lens using a mechanical mechanism suffer from various shortcomings. For example, in some mechanical active systems, a lens' axial position is adjusted actively with a control system based on temperature measurements, image quality measurements, or both. However, active focusing often requires the motorized motion of an element or group of elements to correct the focus. A passive mechanical approach typically involves using high and low CTE materials to shift optical elements to compensate for focus shift. Finding suitable spacer materials can be difficult, and materials such as plastics can provide high CTE but are not mechanical stable.

This disclosure provides an optically athermalized infrared optical telescope and a method for manufacturing such a telescope. Note that while this disclosure is described with respect to afocal infrared telescopes, it will be understood that the principles disclosed here are also applicable to other types of optical systems. The disclosed embodiments can be used in conjunction with various applications that use infrared telescopes, including IR security surveillance and monitoring systems, airborne vehicles, terrestrial systems, defense-related applications, and the like.

Figure 1:
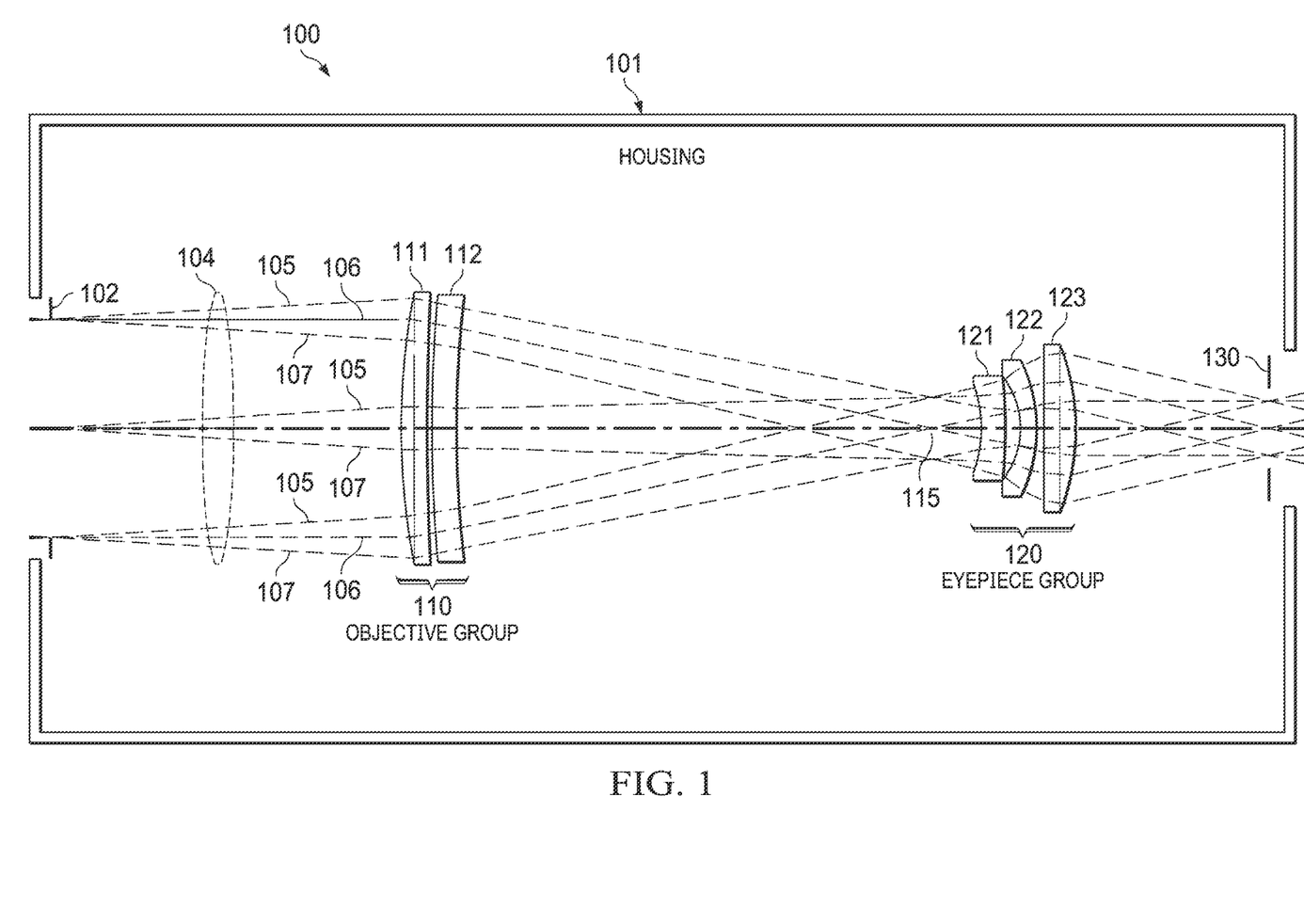
FIG. 1 illustrates an example athermal infrared optical telescope according to this disclosure.

FIG. 1 illustrates an example athermal infrared optical telescope 100 according to this disclosure. In some embodiments, the telescope 100 is configured for use with infrared light, such as light in the long wavelength infrared (LWIR) spectral band (such as wavelengths of approximately 8 microns to approximately 9.5 microns).

The telescope 100 is an afocal telescope that provides a magnification power, such as 2× magnification, 4× magnification, 5× magnification, or any other suitable magnification. In some embodiments, the angular field mapping of the telescope 100 can be represented by the equation $\theta_i = M \theta_o$, where $\theta_i$ is the output angle of light exiting the telescope 100, M is the magnification power, and $\theta_o$ is the input angle of light entering the telescope 100 (here, the subscript i refers to image space, and the subscript o refers to object space). Thus, for 4× magnification, the angular field mapping of the telescope 100 is represented by the equation $\theta_i = 4\theta_o$. In other embodiments, the angular field mapping of the telescope 100 can be represented by the equation $\tan \theta_i = M \tan \theta_o$. As discussed in greater detail below, the telescope 100 can be optimized for low sensitivity of focus and angular field mapping to bulk thermal changes. Stated differently, the telescope 100 can be configured to retain focus and angular field mapping over thermal soak environments across a wide range of temperatures. For example, in some embodiments, the telescope 100 can retain focus across a temperature band of approximately −20° C. to approximately 60° C. The telescope 100 uses optical passive techniques to retain focus, meaning no mechanical systems are required to retain focus in the telescope 100.

As shown in FIG. 1, the telescope 100 includes an entrance pupil 102, an objective group 110, an eyepiece group 120, and an exit pupil 130, which are all disposed within a housing 101. The housing 101 surrounds the other components of the telescope 100 and is provided to contain, group, or protect the other components of the telescope 100 from conditions outside of the housing 101. The housing 101 may be formed using any suitable material(s) and in any suitable manner. For example, in some embodiments, the housing 101 is formed of an aluminum alloy, such as aluminum 6061 or another suitable alloy. In other embodiments, the housing 101 is formed of a nickel-cobalt ferrous alloy, such as KOVAR. Of course, other suitable materials may be used and are within the scope of this disclosure. In addition, the housing 101 may have any suitable size, shape, and dimensions. While not explicitly shown in FIG. 1, the housing 101 may contain or surround other components (such as additional optical elements).

The entrance pupil 102 is configured to receive infrared light 104 from a distant source (like a source that is kilometers or miles away from the telescope 100) such that the light 104 is substantially collimated. The light 104 includes light waves received at different angles across a field of view (FOV). For example, the light 104 includes on-axis light rays 106 (light that is parallel to the optical axis of the telescope 100), light rays 105 incident at a positive angle, and light rays 107 incident at a negative angle. As shown in FIG. 1, each set of light rays 105-107 is substantially collimated. In some embodiments, the telescope 100 has an approximately 5.3° diametrical FOV, although other FOV values are possible and within the scope of this disclosure. Also, in some embodiments, the entrance pupil 102 has a diameter of approximately 4 inches (approximately 10.16 cm), although larger or smaller diameters are possible.

The light 104 from the entrance pupil 102 is received by the objective group 110, which operates to focus the light 104 through an intermediate focal point 115 to the eyepiece group 120. The eyepiece group 120 receives the light 104 from the objective group 110, re-collimates the light 104, and transmits the light 104 to the exit pupil 130. The light 104 leaves the exit pupil 130 collimated, with the on-axis light rays 106 once again on-axis relative to the optical axis of the telescope 100. Because the on-axis light rays 106 are received at the entrance pupil 102 and exit the exit pupil 130 in an on-axis arrangement, the telescope 100 is considered to be afocal since the light 104 does not exhibit a net convergence or divergence. That is, the telescope 100 has an essentially infinite effective focal length.

Each of the objective group 110 and the eyepiece group 120 includes multiple lenses that are arranged in proximity to each other to achieve the function of the respective group 110 and 120. In FIG. 1, the objective group 110 includes two lenses 111-112 and the eyepiece group 120 includes three lenses 121-123, although other numbers of lenses may be used for the objective group 110 and/or the eyepiece group 120. For example, depending on the desired performance of the telescope 100 and the materials selected for the lenses 111-112 and 121-123 and the housing 101, each group 110 and 120 could include a different number of lenses than as shown in FIG. 1.

The one or more materials forming each of the lenses 111-112 and 121-123 may be selected from a number of possible materials. Depending on the implementation, the available materials for use in forming the lenses 111-112 and 121-123 may be somewhat limited. For example, many common lens materials do not transmit LWIR light and thus are not suitable for use in the lenses 111-112 and 121-123 of a LWIR telescope. A non-limiting list of LWIR materials includes $Ge_{33}As_{12}Se_{55}$ (a chalcogenide glass commonly known by the trade names AMTIR-1 and IRG22), $As_{40}Se_{60}$ (a chalcogenide glass commonly known by the trade names AMTIR-2 and IRG26), $BaF_2$ (barium fluoride), GaAs (gallium arsenide), Ge (germanium), ZnS (zinc sulfide), and ZnSe (zinc selenide).

In some embodiments, the lenses 111-112 and 121-123 have the following properties. In the objective group 110, the lens 111 is formed of $As_{40}Se_{60}$ chalcogenide, is aspherical, and operates as a primary refractive lens that provides most of the focusing power. The lens 112 is a secondary lens formed of ZnSe, provides a small amount of correction for chromatic aberrations and thermal compensation, is aspherical, and typically has a slightly negative optical power. In the eyepiece group 120, the lens 121 is aspherical and is formed of $BaF_2$. The lens 122 is spherical and is form of Ge. Together, the lenses 121-122 are secondary lenses that provide small corrections to the optical path. As discussed in greater detail below, the lenses 121-122 help to athermalize the telescope 100 and help to make the focus accurate over the desired wavelength band, such as from about 8 microns to about 9.5 microns. The lens 123 operates as the primary lens that performs most of the refraction in the eyepiece group 120, is formed of $As_{40}Se_{60}$ chalcogenide, and is aspherical. Note, however, that these specific examples of the lenses 111-112 and 121-123 are for illustration only.

In a specific example embodiment, the telescope 100 may be designed with the primary lenses 111 and 123 formed of $As_{40}Se_{60}$ chalcogenide. The use of $As_{40}Se_{60}$ chalcogenide is selected because it can be shown that $As_{40}Se_{60}$ chalcogenide lenses (and similar AsSe chalcogenide glasses), when combined with additional lenses of lesser optical powers, can achieve athermal focus over a wide range of thermal soak temperatures when used with a housing 101 formed of aluminum (such as aluminum 6061 or the like). In addition, there are enough degrees of freedom to correct for issues such as chromatic aberrations and Petzval curvature. A further benefit is that $As_{40}Se_{60}$ chalcogenide has a high index of refraction and has high optical transmission, especially in the LWIR band.

In general, the materials for the lenses 111-112 and 121-123 are selected to have a focal thermo-optical coefficient x that is closest to the CTE of the material selected for the housing 101. Stated differently, the initial selection of one or more lens materials in the design of the telescope 100 includes selecting the one or more lens materials such that the focal thermo-optical coefficients x for the objective group 110 and the eyepiece group 120 are reasonably close to the CTE of the housing 101. This allows the optical properties of the telescope 100 to change consistent with the housing 101 regardless of temperature. The focal thermo-optic coefficient X, which is a measure for estimating the change in focal length of a lens with temperature, is given by:

$$\chi = \frac{1}{f}\frac{df}{dT} = \alpha - \frac{1}{(n-1)}\frac{dn}{dT}$$

where f is the focal length of the lens, a is the CTE of the lens material, n is the index of refraction of the lens, and T is temperature. For an athermal focus condition, the thermo-optic coefficients X for the objective group 110 and the eyepiece group 120 should match, or be suitably close to, the CTE of the housing 101.

Table 1 below shows the CTE for several example materials that can be used for the housing 101. Table 2 below shows the thermo-optic coefficient X for the various example lens materials that are listed above. As shown in Table 2 below, only $As_{40}Se_{60}$ chalcogenide and $BaF_2$ have positive thermo-optic coefficient values. Negative values mean that, for a given temperature change, the focus of the telescope 100 shifts in the opposite direction that the housing 101 grows or shrinks. Of the two lens materials in Table 2 that exhibit positive thermo-optic coefficients, $As_{40}Se_{60}$ chalcogenide is generally considered a better choice for use in the primary lenses 111 and 123 because of its high index of refraction, which enhances aberration control.

TABLE 1

CTE of Different Housing Materials

| Housing Material | CTE [$\times 10^{-6}/°$ C.] |
|---|---|
| Aluminum 6061 | 22.66 |
| KOVAR | 5 |

TABLE 1-continued

CTE of Different Housing Materials

| Housing Material | CTE [$\times 10^{-6}/°$ C.] |
|---|---|
| SS316 | 16 |
| Ti—6Al—4V | 8.6 |

TABLE 2

Thermo-Optic Coefficients of Different Lens Materials

| Lens Material | LWIR Thermo-Optic Coefficient [$\times 10^{-6}/°$ C.] |
|---|---|
| $Ge_{33}As_{12}Se_{55}$ chalcogenide | −35.3 |
| $As_{40}Se_{60}$ chalcogenide | 5.02 |
| $BaF_2$ | 54.6 |
| GaAs | −76.2 |
| Ge | −129.2 |
| ZnS | −27.5 |
| ZnSe | −35.8 |

By itself, $As_{40}Se_{60}$ chalcogenide can be used as a single lens material in embodiments where the housing 101 is formed of KOVAR, since the CTE of KOVAR is about 5 and the thermo-optic coefficient X for $As_{40}Se_{60}$ chalcogenide is 5.02. These values are very close and thus a good match. However, material cost and availability are additional considerations when selecting materials for use in the housing 101. In some embodiments, aluminum 6061 is a preferred common and low-cost material for forming the housing 101. However, the CTE of aluminum 6061 is 22.66, which is not as close to the thermo-optic coefficient X for $As_{40}Se_{60}$ chalcogenide as the CTE for KOVAR.

In embodiments where a single lens of one material has a thermo-optic coefficient that is not suitably close to the CTE of the housing 101, multiple lenses formed of different materials can be combined to bring the overall thermo-optic coefficient closer to the CTE of the housing 101. This means that, in the embodiment shown in FIG. 1, the lenses 111-112 can be formed of different materials, and the lenses 121-123 can be formed of different materials.

Optically, adjacent thin lenses can be considered as an equivalent single thin lens according to the follow equation:

$$\varnothing_{eff} = \sum_{k=1}^{N}\varnothing_k$$

where:

$\varnothing_k = (n_k - 1)\Delta c_k$

Here, N is the number of combined thin lenses, $\varnothing_{eff}$ is the optical power of the combined lenses, $\varnothing_k$ is the optical power of the kth thin lens, $n_k$ is the average index of refraction over the spectral band, and $\Delta c_k$ is the curvature difference between the front and back lens surfaces. The thermo-optical coefficient $X_{eff}$ for the composite lens is given by:

$$\chi_{eff} = \frac{1}{f_{eff}}\frac{df_{eff}}{dT} = \sum_{k=1}^{N}\chi_k\frac{\varnothing_k}{\varnothing_{eff}}.$$

Using this equation and the materials in the embodiment of the telescope 100 described above, the thermo-optical coefficient $X_{eff}$ for achromatic thin lenses 111-112 in the objective group 110 can be calculated as approximately 32.1, while the thermo-optical coefficient $X_{eff}$ for achromatic thin lenses 121-123 in the eyepiece group 120 can be calculated as approximately 154. Compared to other combinations of materials (many of which have $X_{eff}$ values that are negative), these values [32.1, 154] are reasonably close to the CTE of 22.66 for an initial design point. Full optimization with thick lenses and real-ray tracing leads to the final design.

In some embodiments, computer modeling, such as real-ray tracing, can be used during the design process of the telescope 100 to simulate lens growth, dn/dT changes, and motion due to thermal expansion of the housing 101 over temperature. Such modeling can optimize the design for wavefront error (WFE) and optionally control angular field mapping over a range of temperatures. In particular, one or more methods similar to those described in U.S. Pat. No. 10,330,929 (the contents of which are hereby incorporated by reference) can be used to evaluate groups of materials that would form an achromatic thin lens group, such as the objective group 110 or the eyepiece group 120. The determined composite thermo-optical coefficient $X_{eff}$ for each group can then be compared to the CTEs for various possible materials for the housing 101. Also, in some embodiments, the telescope 100 can be used in conjunction with other optical elements as part of an overall imaging system. However, the telescope 100 may be used in any other suitable manner.

Figure 2:
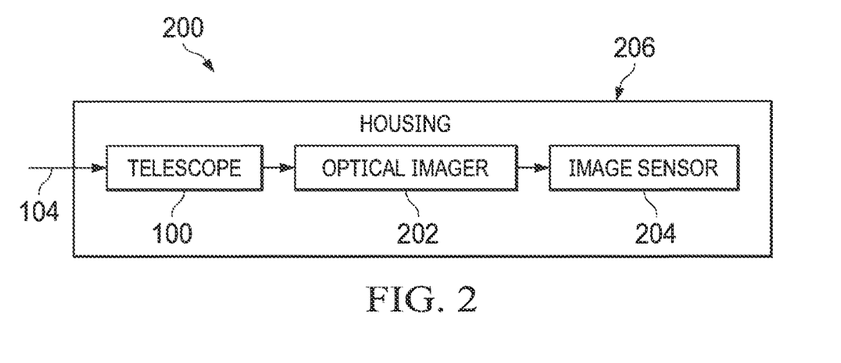
FIG. 2 illustrates an example imaging system having an athermal infrared optical telescope according to this disclosure.

FIG. 2 illustrates an example imaging system 200 having an athermal infrared optical telescope 100 according to this disclosure. As shown in FIG. 2, the imaging system 200 includes the telescope 100, an optical imager 202, at least one image sensor 204, and a housing 206. Light 104 from an external source is received at the telescope 100 (such as at the entrance pupil 102) and is subject to various operations as described above (such as using the lenses 111-112 and 121-123) before exiting the telescope 100 (such as through the exit pupil 130). The optical imager 202 may receive the light 104 that exits the telescope 100 and perform one or more optical operations to the light 104. Example optical operations may include one or more reflections, refractions, focusing, filtering, and the like in order to prepare the light 104 to be received by the image sensor 204. The optical imager 202 can include any suitable number(s) and type(s) of optical element(s), such as one or more lenses, filters, gratings, mirrors, and the like.

The image sensor 204 is configured to receive the light 104 from the optical imager 202 and generate one or more images corresponding to the source of the light 104. For example, the image sensor 204 may be configured to detect or measure one or more physical quantities, states, or properties of the light 104 and convert the detected or measured information into electrical signals. As a particular example, the image sensor 204 can include one or more cameras, light detectors, or other imaging sensors for capturing images of scenes. In addition, the image sensor 204 can include control circuitry for controlling the image sensor 204.

The housing 206 surrounds the other components of the imaging system 200 and is provided to contain, group, or protect the components of the imaging system 200 from conditions outside of the housing 206 including extraneous light paths. In some embodiments, the housing 206 is (or includes) the housing 101 of the telescope 100 as described in FIG. 1. In other embodiments, the housing 206 is a separate housing distinct from the housing 101. The housing 206 may be formed from any suitable material(s) and in any suitable manner. For example, in some embodiments, the housing 206 is formed of an aluminum alloy, such as aluminum 6061 or another suitable alloy. In other embodiments, the housing 206 is formed of a nickel—cobalt ferrous alloy, such as KOVAR. Of course, other suitable materials may be used and are within the scope of this disclosure.

Figure 3A:
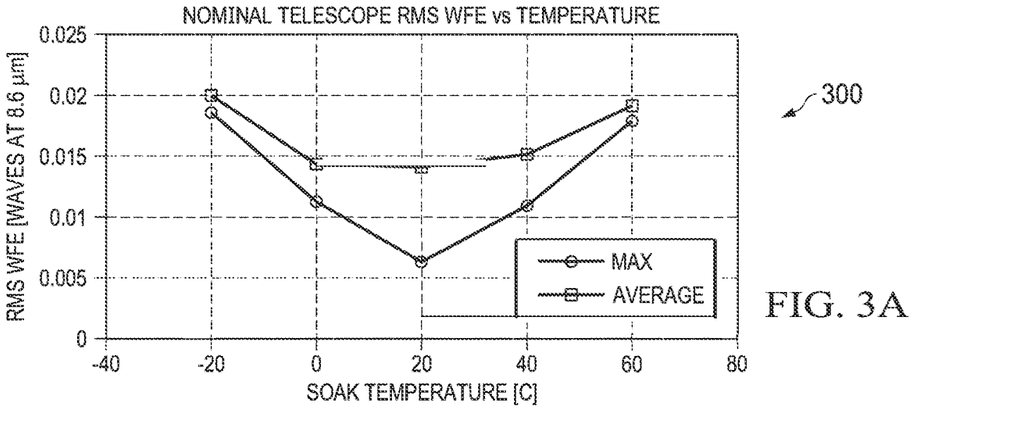
FIGS. 3A and 3B illustrate example performance characteristics of the telescope of FIG. 1 according to this disclosure.
Figure 3B:
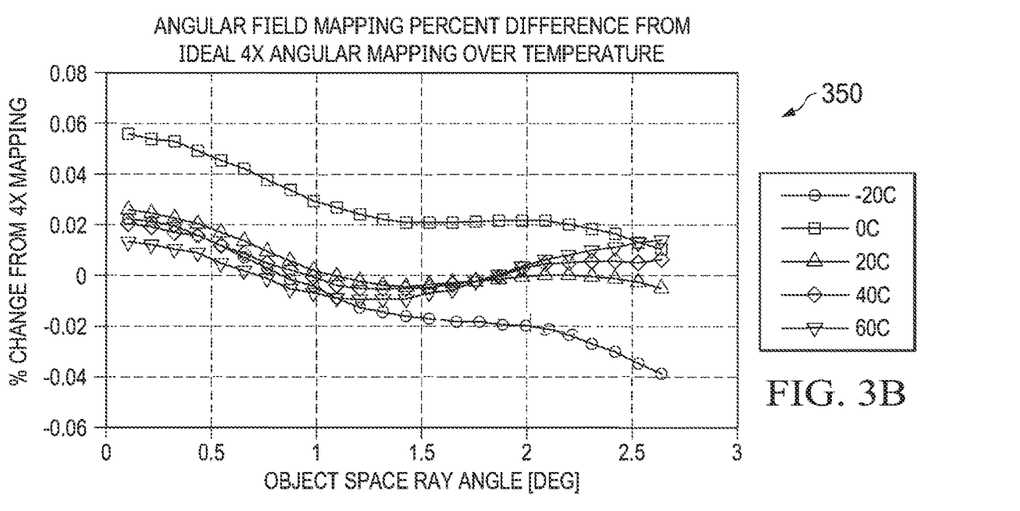

FIGS. 3A and 3B illustrate example performance characteristics of the telescope 100 according to this disclosure. In particular, FIG. 3A illustrates a chart 300 showing the root mean square (RMS) WFE of the telescope 100 as a function of soak temperature. As shown in FIG. 3A, in some embodiments, when operating at 20° C., the telescope 100 exhibits a maximum RMS WFE of 0.014 waves and an average RMS WFE of 0.007 waves at a wavelength of 8.6 microns. Since standard WFE tolerances are in the range of 0.07 waves at 8.6 microns, the performance of the telescope 100 is approximately ten times better than required.

FIG. 3B illustrates a chart 350 showing the percentage change in angular field mapping of the telescope 100 from the ideal angular field mapping as a function of the object space ray angle. As shown in FIG. 3B, the change to the angular field mapping of the telescope 100 over various temperature ranges is a small fraction of a percent.

Figure 4:
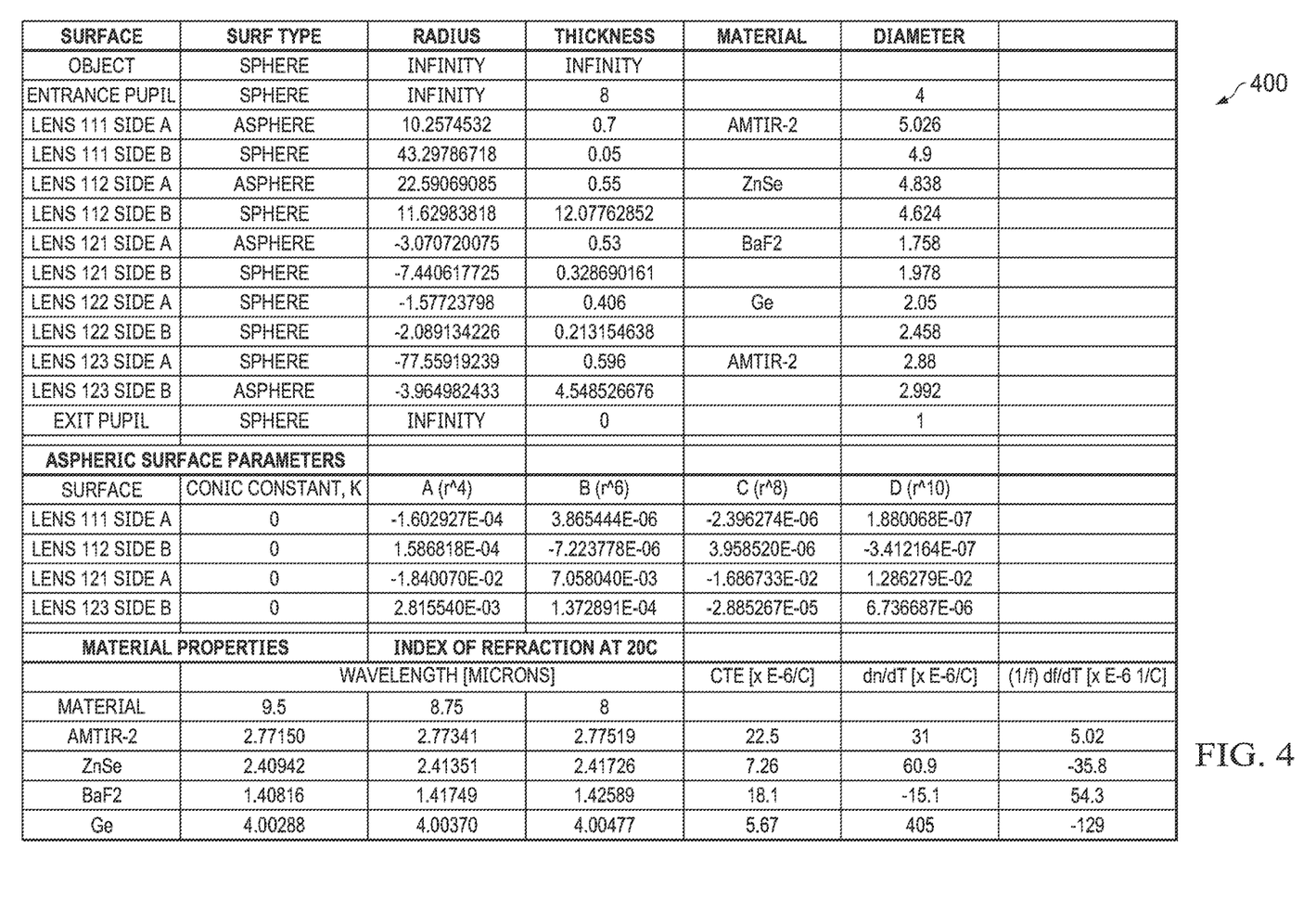
FIG. 4 illustrates an example prescription of the telescope of FIG. 1 according to this disclosure.

FIG. 4 illustrates a chart 400 showing one example prescription of the telescope 100 according to this disclosure. As shown in FIG. 4, the optical prescription 400 includes prescriptions and materials for each of the lenses 111-112 and 121-123, including aspheric surface parameters for the aspheric lenses. The parameters A, B, C, and D associated with the aspheric surfaces in the chart 400 relate to the following equation, which describes an aspheric surface, as known in the art:

$$z = \frac{cr^2}{1 + \sqrt{1 - (1+K)c^2r^2}} + Ar^4 + Br^6 + Cr^8 + Dr^{10}$$

where c=1/R, R is the base radius of the surface, and K is the conic constant. It will be understood that the values and materials shown in the chart 400 represent one non-limiting example prescription of the telescope 100; other values and materials are possible, as discussed above.

Although FIGS. 1 through 4 illustrate examples of an athermal infrared optical telescope 100 and imaging system 200 having an athermal infrared optical telescope 100 along with related details, various changes may be made to FIGS. 1 through 4. For example, while the lenses 111-112 and 121-123 are described as including certain materials, any other suitable materials can be used. Also, various components in the telescope 100 or imaging system 200 may be combined, further subdivided, replicated, rearranged, or omitted and additional components may be added according to particular needs. In addition, the charts shown in FIGS. 3A, 3B, and 4 are for illustration only and can vary as needed or desired.

Figure 5:
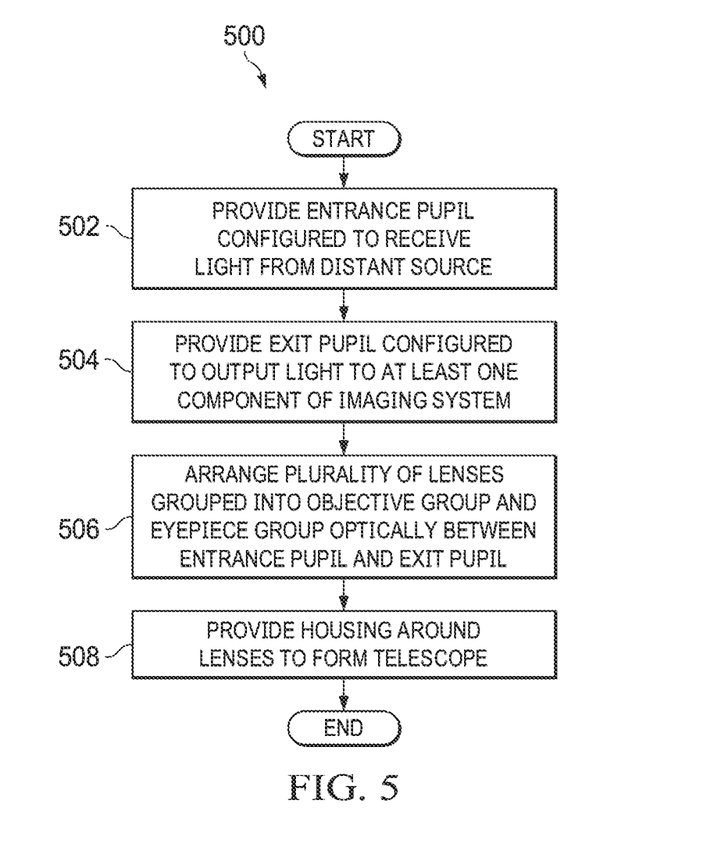
FIG. 5 illustrates an example method for manufacturing an athermal infrared optical telescope according to this disclosure.

FIG. 5 illustrates an example method 500 for manufacturing an athermal infrared optical telescope according to this disclosure. For ease of explanation, the method 500 is described as being performed to manufacture the telescope 100 of FIG. 1. However, the method 500 may be used to manufacture any other suitable telescope or optical device designed according to the teachings of this disclosure.

As shown in FIG. 5, an entrance pupil configured to receive substantially collimated infrared light from a distant source is provided at step 502. This may include, for example, providing the entrance pupil 102 for use in the telescope 100. An exit pupil configured to output the light to at least one component of an imaging system is provided at step 504. This may include, for example, providing the exit pupil 130 for use in the telescope 100. A plurality of lenses is arranged optically between the entrance pupil and the exit pupil at step 506. The lenses are grouped into an objective group and an eyepiece group. This may include, for example, arranging the lenses 111-112 into the objective group 110 and arranging the lenses 121-123 into the eyepiece group 120. A housing is provided around the lenses to form a telescope at step 508. This may include, for example, providing the housing 101 around the lenses 111-112 and 121-123 to form the telescope 100. The housing is formed of a housing material, and the lenses are formed of one or more lens materials selected based on a thermo-optical coefficient of the one or more lens materials and a CTE of the housing material.

Although FIG. 5 illustrates one example of a method 500 for manufacturing an athermal infrared optical telescope, various changes may be made to FIG. 5. For example, while shown as a series of steps, various steps in FIG. 5 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device comprising:
an entrance pupil configured to receive light from a distant source;
an exit pupil configured to output the light to at least one component of an imaging system;
a plurality of lenses disposed optically between the entrance pupil and the exit pupil, the lenses grouped into an objective group and an eyepiece group; and
a housing surrounding the lenses and formed of a housing material;
wherein the lenses of the objective group and the eyepiece group are formed of one or more lens materials selected to have a focal thermo-optical coefficient that is closest to a coefficient of thermal expansion (CTE) of the housing material among focal thermo-optical coefficients of a plurality of possible lens materials, wherein the focal thermo-optical coefficient of a material indicates a change in focal length of a lens formed of that material due to temperature.

2. The device of claim 1, wherein the lenses are configured such that the device is afocal.

3. The device of claim 1, wherein at least one of the lenses in each of the objective group and the eyepiece group is formed of $As_{40}Se_{60}$ chalcogenide.

4. The device of claim 1, wherein the lenses of the objective group comprise a primary lens and at least one secondary lens.

5. The device of claim 1, wherein the lenses of the eyepiece group comprise a primary lens and at least one secondary lens.

6. The device of claim 1, wherein the housing is formed of an aluminum alloy or a nickel-cobalt ferrous alloy.

7. The device of claim 1, wherein the light is in a wavelength band of approximately 8 microns to approximately 9.5 microns.

8. The device of claim 1, wherein the one or more lens materials selected for the lenses have a focal thermo-optical coefficient substantially equal to the CTE of the housing material.

9. A system comprising:
an image sensor;
an optical imager; and
a telescope comprising:
- an entrance pupil configured to receive light from a distant source;
- an exit pupil configured to output the light for reception by the optical imager and the image sensor;
- a plurality of lenses disposed optically between the entrance pupil and the exit pupil, the lenses grouped into an objective group and an eyepiece group; and
- a housing surrounding the lenses and formed of a housing material;
- wherein the lenses of the objective group and the eyepiece group are formed of one or more lens materials selected to have a focal thermo-optical coefficient that is closest to a coefficient of thermal expansion (CTE) of the housing material among focal thermo-optical coefficients of a plurality of possible lens materials, wherein the focal thermo-optical coefficient of a material indicates a change in focal length of a lens formed of that material due to temperature.

10. The system of claim 9, wherein the lenses are configured such that the telescope is afocal.

11. The system of claim 9, wherein at least one of the lenses in each of the objective group and the eyepiece group is formed of $As_{40}Se_{60}$ chalcogenide.

12. The system of claim 9, wherein the lenses of the objective group comprise a primary lens and at least one secondary lens.

13. The system of claim 9, wherein the lenses of the eyepiece group comprise a primary lens and at least one secondary lens.

14. The system of claim 9, wherein the housing is formed of an aluminum alloy or a nickel-cobalt ferrous alloy.

15. The system of claim 9, wherein the light is in a wavelength band of approximately 8 microns to approximately 9.5 microns.

16. The system of claim 9, wherein the one or more lens materials selected for the lenses have a focal thermo-optical coefficient substantially equal to the CTE of the housing material.

17. A method comprising:
- providing an entrance pupil configured to receive light from a distant source;
- providing an exit pupil configured to output the light to at least one component of an imaging system;
- arranging a plurality of lenses optically between the entrance pupil and the exit pupil, the lenses grouped into an objective group and an eyepiece group; and
- providing a housing around the lenses to form a telescope, the housing formed of a housing material;
- wherein the lenses of the objective group and the eyepiece group are formed of one or more lens materials selected to have a focal thermo-optical coefficient that is closest to a coefficient of thermal expansion (CTE) of the housing material among focal thermo-optical coefficients of a plurality of possible lens materials, wherein the focal thermo-optical coefficient of a material indicates a change in focal length of a lens formed of that material due to temperature.

18. The method of claim 17, wherein the lenses are configured such that the telescope is afocal.

19. The method of claim 17, wherein at least one of the lenses in each of the objective group and the eyepiece group is formed of $As_{40}Se_{60}$ chalcogenide.

20. The method of claim 17, wherein the one or more lens materials selected for the lenses have a focal thermo-optical coefficient substantially equal to the CTE of the housing material.

* * * * *